March 7, 1967  E. SNITZER ETAL  3,308,394
OPTICAL RESONANT CAVITIES
Filed Nov. 2, 1960  4 Sheets-Sheet 1
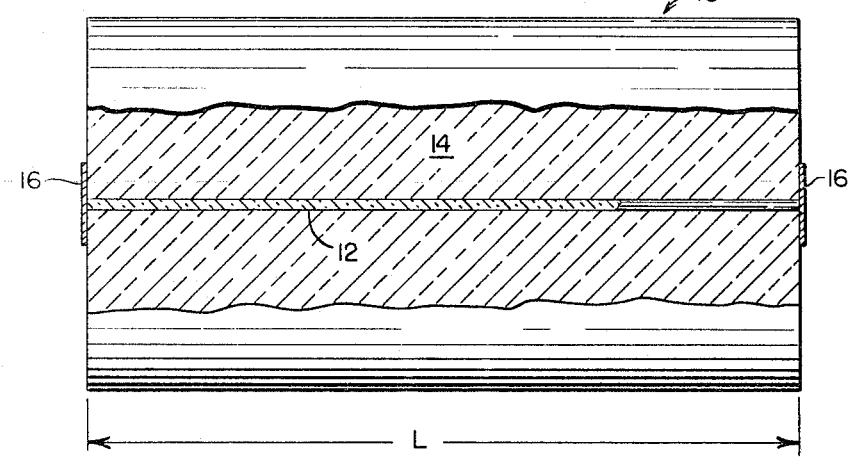
FIG. 1
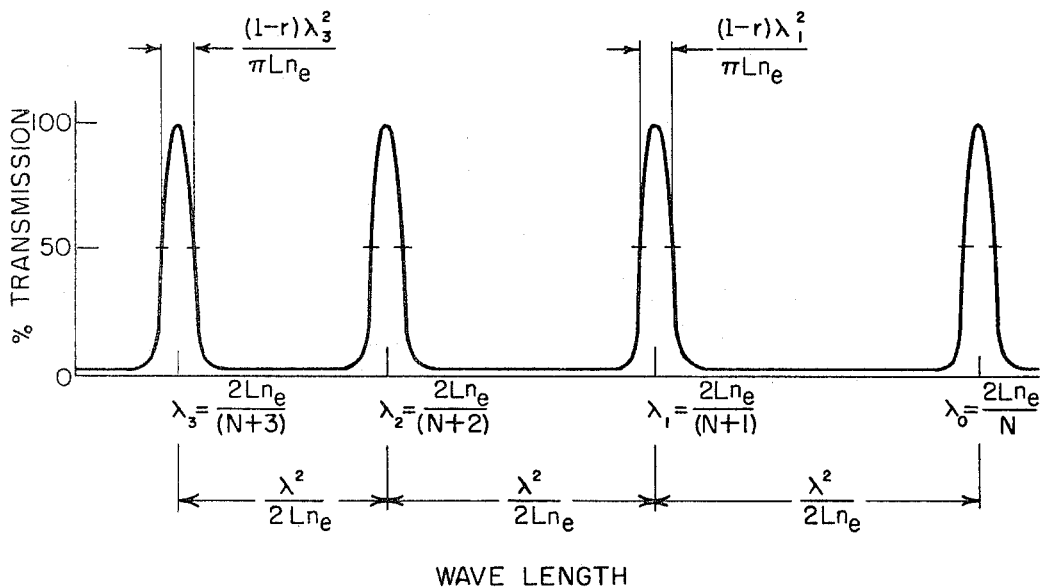
FIG. 2  WAVE LENGTH →
INVENTORS
ELIAS SNITZER
HAROLD OSTERBERG
BY
ATTORNEYS

United States Patent Office 3,308,394
Patented Mar. 7, 1967

3,308,394
OPTICAL RESONANT CAVITIES
Elias Snitzer and Harold Osterberg, Sturbridge, Mass., assignors to American Optical Company, Southbridge, Mass., a voluntary association of Massachusetts
Filed Nov. 2, 1960, Ser. No. 66,815
16 Claims. (Cl. 331—94.5)

Our invention relates to a resonant cavity constructed for use with electromagnetic energy at frequencies corresponding to the visible, infrared and ultra-violet regions.

A copending application, Serial No. 12,128, filed March 1, 1960 now Patent No. 3,157,726, issued Nov. 17, 1964, in the names of John W. Hicks, Jr., Elias Snitzer and Harold Osterberg, which is assigned to the assignee of the present invention, discloses that very fine fibers of transparent material, when coated or clad with a material of lower refractive index, operate as dielectric waveguides for electromagnetic energy at frequencies (or wavelengths) of the same order as those of light. Such devices will be referred to herein as "optical waveguides." It will be understood of course that references to "light" and "optical energy" are not meant to exclude the use of such waveguides from energy in the infrared or ultraviolet regions of the spectrum. The term "optical waveguides" will be used herein to refer generically to waveguides of the type disclosed in the referenced application.

In many applications, in conjunction with optical waveguides of the type described in the above-identified application it is desirable to provide resonant cavities for the same purposes as resonant cavities are provided in connection with microwave waveguides, i.e. frequency selection, filtering, frequency measurement etc. Further it is sometimes desirable to provide such cavities which are tunable over a band or range of frequencies. Such cavities may also be used separately from optical waveguides to obtain extremely narrow lines; tunable optical reasonant cavities may also be used for analysis of energy in the visible spectrum.

Heretofore, various types of interferometers have been used in the optical region for spectrum analysis, wavelength measurement and similar purposes. One of these, the Fabry-Perot interferometer, utilizes a pair of partially reflecting parallel plates with a dielectric medium, such as air or glass between them. Light impinging on the outer surface of one plate of the set is transmitted through it and undergoes multiple reflections between the plates. By reason of interference effects, the light transmitted by the second plate consists of sharply defined interference rings.

A Fabry-Perot interferometer as described above has heretofore been proposed as the resonant structure in an optical maser, as shown for example in United States Patent No. 2,929,922 issued March 22, 1960 to Schawlow et al. (See also A. L. Schawlow and C. H. Townes, 112 Physical Review, 1940 (1958).) However, the use of a Fabry-Perot interferometer as the resonant structure in an optical maser presents several problems because of the nature of the interferometer structure. In a maser, a "negative temperature" is maintained in a maser material by the application of pumping power to it, i.e. the normal distribution of energy states of the atoms or molecules of the master material is changed by the application of pumping power to a statistically improbable distribution. As the atoms or molecules change from an energy state to which they have been raised back to an energy state corresponding to a normal distribution they emit energy. In a maser generator, these transitions are relied upon to generate the desired signal. In a maser amplifier, the applied signal is used to stimulate the desired transition.

Masers were first developed at microwave frequencies; at these frequencies resonant structures such as resonant cavities and waveguides are available. These devices have a very high "Q" and energy supplied to the resonant structure by the emission from spontaneous transitions is coupled strongly into a proper mode for the structure and hence the maser generators supplied a monochromatic signal with a high signal to noise ratio. Other modes which are undesirable since they contribute to output noise are very strongly damped by conventional resonant structures at microwave frequencies. At microwave frequencies coupling of the emitted energy to an improper mode is not a particular problem.

However, in optical masers reasonant structures having the very high Q's of microwave structures are not available and much of the emitted energy is coupled into improper modes and appears as undesired noise at the maser output. Hence, to obtain a monochromatic signal at a high signal to noise ratio in optical masers proportionately much higher pumping power is required than in microwave masers. A Fabry-Perot interferometer, used as the resonant structure in an optical maser, can cause a resonance effect only in energy which is in a direction which is substantially perpendicular to the parallel reflecting plates. Energy emitted in other directions cannot be enchanced by the resonant structure because it is the wrong mode for the interferometer, and hence it merely contributes to the output noise.

The use of a Fabry-Perot interferometer of realizable dimensions also involves a substantial volume of maser material. Since maser action is dependent upon pump power density, optical masers of the type described require high absolute values of pumping power for this reason also. While sources of pumping power are available capable of supplying large amounts of energy, it is difficult to concentrate this power in the maser material to achieve the necessary high pumping power density.

Accordingly, a principal object of our invention is to provide an optical resonant cavity. Another object of our invention is to provide an optical resonant structure having one or a few resonant modes of much higher Q than optical resonant structures heretofore available. A further object of our invention is to provide a tunable optical resonant cavity. A still further object of our invention is to provide an electrically tunable optical reasonant cavity. Yet a further object of our invention is to provide a cavity made according to our invention which is tunable in response to applied physical forces, as for example heat and pressure. Yet another object of our invention is to provide an optical resonant cavity useful as the resonant structure of optical masers. Other and further objects of our invention will in part be obvious and will in part appear hereinafter.

Our invention accordingly comprises the features of construction, combinations of elements, and arrangements of parts which will be exemplified in the constructions hereinafter set forth, and the scope of the invention will be indicated in the claims.

For a fuller understanding of the nature and objects of the invention, reference should be had to the following detailed description taken in connection with the accompanying drawings in which:

FIG. 1 is a vertical sectional view of an optical resonant cavity made according to our invention;

FIG. 2 is a plot of maximum transmission as a function of wavelength in optical resonant cavities made according to our invention;

Figure 3:
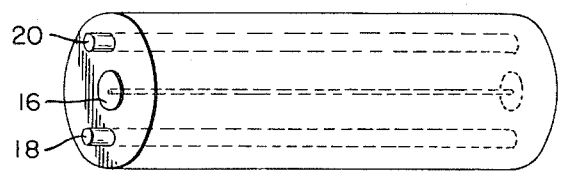
FIG. 3 is a perspective view partially broken away of one embodiment of an electrically tunable optical resonant cavity.

As is described in greater detail in the copending application mentioned above, it has now been determined that a transparent filament will act as a waveguide for optical energy if the filament is of very small diameter and is surrounded by a medium whose index of refraction is lower than that of the filament material. For example glass fibers which are clad with glass of lower refractive index will act as waveguides if their diameter is not greater than about 25 times the longest wavelength of the light to be guided. It has been shown that such optical waveguides exhibit all the properties characteristic of dielectric waveguides, including propagation of the light in definable and characteristic modes. The copending application mentioned above discloses techniques by which such optical waveguides may be manufactured.

We have now found that optical resonant cavities may be made by cutting optical waveguides of the type described to a length determined by the wavelength of the optical energy it is desired to resonate. The ends of the clad filament or core of the cavity are made substantially parallel and preferably perpendicular to the axis of the filament; each end is provided with a coating which is partially transparent and partially reflecting to the optical energy it is desired to resonate.

If wide band optical energy is focused on one of the coated ends of the filament, the energy transmitted from the other end of the cavity will be substantially monochromatic, the line width depending on the Q of the cavity in much the same way that the bandwidth of the energy transmitted by any filter depends upon its Q.

Optical resonant cavities made according to our invention may be tuned to resonate at different frequencies by changing their effective optical length. The tuning arrangements may utilize an actual physical change in length such as is brought about by pressure or temperature variation, or the effective optical length may be changed electrically by the Kerr effect as will be described in greater detail below.

Optical resonant cavities, made according to our invention are "closed" resonant structures, as opposed to "open" resonant structures of the Fabry-Perot interferometer type. They therefore couple energy into a mode to which the cavity is resonant as do closed resonant structures such as microwave cavities. For this reason masers using cavities of our invention as the resonant structure require considerably less pumping power than do masers using Fabry-Perot interferometers as the resonant structure. Additionally mode selection in cavities made according to our invention is much better than in known optical masers using open resonant structures.

With reference now to FIG. 1, we have here illustrated an optical resonant cavity 10, made in accordance with our invention. It will be understood that certain details of FIG. 1 have been greatly enlarged for purposes of explanation.

In general the cavity includes a central filament or core 12 of glass or other material substantially transparent to the energy it is desired to resonate. This fiber has a very small diameter, preferably not more than 25 times the diameter of the longest wave length that it is desired to resonate in the cavity. Typical core diameters for the visible spectrum are in the 4 to 8 micron range, i.e. about 10 times the wavelength of the energy which it is desired to resonate, although propagation of visible light in a finite number of distinguishable modes has been observed in cavities having core diameters as large as 30 microns. Certain modes will not propagate as the core diameter is made smaller, as will be discussed in greater detail below. In general it is desirable to make the core diameter sufficiently small to insure a single mode or at most a few modes.

While we have disclosed glass as a core material, other materials, either solid or liquid or mixtures thereof might be used. For example an oil having a high index of refraction might be used as a core by placing the oil in a hollow tube. Particles of high refractive index such as flint glass may be embedded in a plastic material such as methyl methacrylate.

Surrounding the filament or core 12 is a glass cladding 14 of a lower index of refraction $n_2$ than the material of the core. This cladding should be at least 2 or 3 microns thick for the core to serve as an optical resonant cavity. We have found that it is preferable to make the cladding many hundreds of times thicker than the core so that the cladding serves also as a support for the core 12. While we have shown the cladding 14 as being of glass, it is to be understood that the cladding need not be of glass but might be an inert gas in which the core 12 is supported by some other means. From the standpoint of the operation of the resonator the only requirement is that the medium surrounding the core have an index of refraction for the optical energy of interest which is lower than that of the core and that it be reasonably thick. As shown in FIG. 1, the ends of core 12 are parallel and substantially perpendicular to the longitudinal axis of the filament 12. Each of the ends is also provided with a coating 16 which partially transmits and partially reflects the optical energy to be resonated. We have found for example that the ends of the filament 12 may be coated with an evaporated film of aluminum or silver. Silver coatings for example have a reflection coefficient of about 90% and a transmission coefficient of about 5%. About 5% of the incident energy is absorbed by the coating. Such evaporated film has a thickness of about 0.04 micron.

In designing an optical resonant cavity the radius $a$ (or diameter $2a$) of the core 12 must be selected and the length L must also be selected on the basis of the frequencies which it is desired to resonate. As is explained in greater detail in the application cited above, for propagation in a dielectric waveguide or cavity, the following inequality must be satisfied:

$$Unm < 2\pi(a/\lambda)(n_1^2 - n_2^2)^{1/2} \qquad (1)$$

In this inequality $a$ is the radius of the core, $\lambda$ is the free space wavelength of the energy it is desired to propagate, $n_1$ is the index of refraction of the core and $n_2$ is the index of refraction of the cladding. $Unm$ is a constant which is the argument of the $n$th order Bessel function at the $m$th root. For the 0 order Bessel function, at the first root $Unm$ has a value of 2.405, at the second root 5.520 etc. For the first order Bessel function, at the first root $U_{11}$ has a value of 0, for the second root a value of 3.832 etc. The fact that the argument of the first order Bessel function at the first root has a 0 value is significant as will be explained in detail below.

Each of the various roots of the various orders of Bassel function corresponds to the cut off value of wavelength for a particular mode. Thus when $Unm$ is equal to $2\pi(a/\lambda)(n_1^2-n_2^2)^{1/2}$ rather than being less than this value, the particular mode corresponding to this root will not propagate. Thus if $2\pi(a/\lambda)(n_1^2-n_2^2)^{1/2}$ is equal to or less than 2.405 ($U_{01}$) the $TE_{01}$ or $TM_{01}$ modes will not propagate.

As noted above one mode, the $HE_{11}$, has a cut-off value of $U_{11}$ which is 0. All other modes have higher cut-off values. Therefore if the value of core diameter $a$ and indices of refraction $n_1$ and $n_2$ are so chosen that for the shorest wavelength (corresponding to the highest frequency) of the energy to be resonated, $$2\pi(a/\lambda)(n_1^2-n_2^2)^{1/2} < 2.405$$

only the $HE_{11}$ mode can be propogated at any frequency of interest since the core dimensions are too small to support any other modes of propagation. For example, for values of $n_2=1.56$ and $n_1=1.52$, all higher modes are cut off for energy at the green line of mercury in a core of 1.43 microns radius. This size is much greater than the 0.1 micron radius of the very small fibers which have been made and in which the $HE_{11}$ mode has been observed.

While the cross sectional shape of the thin elongated filament 12 is preferably circular, or approximately circular, it should be understood that other shapes are also useable, such as elliptical, hexagonal, rectangular etc. For the shapes which are other than circular, the cut off values for the resonant condition will be somewhat altered. An equation of the form given above for the cut off condition in a circular filament will still apply. However, for non-circular filaments $U_{nm}$ will be the root of an equation other than a Bessel function and $a$ will be some parameter of the filament cross section. Accordingly, while we will explain out invention in terms of circular filaments or cores, it is to be understood that we do not intend thereby to exclude from our invention cores or filaments of other cross sections which are also operative to provide resonant structures of the type herein described.

While the selection of core radius and the indices of refraction set an upper limit to the frequencies which will propagate with a single mode, the length L of the optical resonant cavity determines the frequency of resonance. As in other resonant structures the length of the core between the reflecting surfaces should be an integral number N of half wavelengths in the guide i.e.

$$L = \frac{N}{2}\left(\frac{\lambda}{n_e}\right) \quad (2)$$

where $\lambda$ is the free space wavelength of the frequency it is desired to resonate and $n_e$ is the effective index of refraction in the cavity for the resonant mode. In practice, the exact length for resonance will vary slightly from that given by the above equation because of phase shifts which occur at each of the reflecting surfaces However these phase changes will have only a small effect and after selecting a length which is approximately correct from the above equation, the actual length may be obtained by polishing of the ends of the filament. Accordingly, in the discussion which follows, this slight difference from the calculated length of the cavity will be neglected. As used herein and in the claims the length of the cavity will be described as being substantially equal to an integral number of half wavelengths of the energy to which the cavity is resonant, the term "substantially" being included to account for the slight difference from an exact integral number of half wavelengths resulting from the phase shift at the reflecting surfaces.

From Equation 2 the separation of the resonant frequencies in a spectrum applied to the cavity can be calculated. If it is assumed that a cavity is resonant at a frequency corresponding to wavelength $\lambda_1$, i.e. that $$N\frac{\lambda_1}{2} = Ln_e \quad (3)$$

then it will also be resonant at a wavelength $\lambda_2$ given by $$(N+1)\frac{\lambda_2}{2} = Ln_e \quad (4)$$

$\lambda_2$ being a shorter wavelength and therefore a higher frequency than the first.
Since $$\lambda_1 = \frac{2Ln_e}{N} \text{ and } \lambda_2 = \frac{2Ln_e}{(N+1)}$$

then $\Delta\lambda$, the difference in wavelength between $\lambda_1$ and $\lambda_2$ will be:

$$\lambda_1 - \lambda_2 = \Delta\lambda = 2Ln_e\left[\frac{1}{N} - \frac{1}{(N+1)}\right]$$

$$= 2Ln_e\left[\frac{N+1-N}{N(N+1)}\right]$$

However $$N = \frac{2Ln_e}{\lambda_1} \text{ and } N+1 = \frac{2Ln_e}{\lambda_2}$$

Therefore $$\Delta\lambda = \frac{2Ln_e}{\frac{2Ln_e}{\lambda_1} \times \frac{2Ln_e}{\lambda_2}} = \frac{\lambda_1\lambda_2}{2Ln_e} \quad (5)$$

If $\lambda_1$ and $\lambda_2$ are close to each other, this last expression becomes:

$$\Delta\lambda = \frac{\lambda^2}{2Ln_e} \quad (6)$$

Equation 6 indicates that the shorter the resonator, the greater will be the wavelength spacing of the energies it will resonate or, in more conventional terms, the greater will be the line spacing. For a resonator of given length the longer the wavelength of the energy applied to it, the greater will be the spacing of adjacent resonator lines.

The Q of a cavity is a measure of its resonant properties and we have found that the Q of optical resonant cavities of the type described is given to a very close approximation by the equation $$Q \approx \frac{2\pi Ln_e}{(1-r)\lambda} \quad (7)$$

where $r$ is the coefficient of reflection of the coated materials. The bulk absorption of the glass or other material of which the cavity is made is neglected in this equation, since we have found that it is usually negligible in cavities made of conventional glasses. We have found that an optical resonant cavity of about 1 inch length, resonant at a wavelength of about 0.5 micron, the ends of the fiber being coated with a silver film having a reflectance $r$ of about 0.95, has a Q of approximately $6.4 \times 10^6$.

Knowing the Q of the cavity, it is possible to calculate the width of each resonant peak in the following manner.

Let $P_o$ be the power incident on the cavity and $P_t$ the power transmitted by the cavity.
Then:

$$P_t = \frac{\frac{P_o}{Q_A \times Q_B}}{\left[\left(\frac{1}{2Q_T}\right)^2 + \left(\frac{f-f_c}{f_c}\right)^2\right]} \quad (8)$$

where $Q_A$ and $Q_B$ are the Q's at the entrance and exit faces of the cavity, $Q_T$ is the Q of the entire cavity, $f_c$ is one of the resonant frequencies of the cavity and $f$ is the frequency of the incident energy having power $P_o$.

From known relationships:

$$\frac{1}{Q_T} = \frac{1}{Q_A} + \frac{1}{Q_B} + \frac{1}{Q_C} \quad (9)$$

where $Q_C$ is the internal Q of the cavity and is determined by internal losses in the cavity. In cavities of symmetrical construction such as are illustrated in FIG. 1, $Q_A = Q_B$. As pointed out previously, the effect of the internal cavity loss compared to the loss at the entrance and exit ends of the cavity is very small.
Thus, $$Q_C \gg Q_A \text{ and } \frac{1}{Q_A} \ll \frac{1}{Q_A} \quad (10)$$

Therefore, $$\frac{1}{Q_T} = \frac{1}{Q_A} + \frac{1}{Q_B} = \frac{2}{Q_A} \quad (11)$$

$$\frac{1}{2Q_T} \quad (12)$$

Substituting in the original Equation 8 gives:

$$P_T = \frac{\frac{P_0}{Q_A^2}}{\left[\frac{1}{Q_A^2} + \left(\frac{f-f_c}{f_c}\right)^2\right]} = \frac{P_0}{1 + Q_A^2\left(\frac{f-f_c}{f_c}\right)^2} \quad (13)$$

At the half power points, the transmitted power will be ½ the incident power if other losses are neglected. Thus, at this frequency, $$1 + Q_A^2\left(\frac{f-f_c}{f_c}\right)^2 = 2 \quad (14)$$

or $$Q_A^2\left(\frac{f-f_c}{f_c}\right)^2 = 1 \quad (15)$$

which by rearrangement gives $$\frac{f-f_c}{f_c} = \frac{1}{Q_A} \quad (16)$$

From Equation 7

$$Q_A = \frac{2\pi L n_e}{(1-r)\lambda} \quad (17)$$

or $$\frac{1}{Q_A} = \frac{(1-r)C}{2\pi L n_e f} \quad (18)$$

C being the velocity of light in a vacuum.
Thus the equation for the half power frequencies becomes $$\frac{f-f_c}{f_c} = \frac{(1-r)C}{2\pi L n_e f} \quad (19)$$

Substituting for $f-f_c$, the frequency half-width of the line, $\Delta f$, we have $$\Delta f = \frac{(1-r)C}{2\pi L n_e} \quad (20)$$

The wavelength spread of the line itself (herein $2\Delta\lambda_s$) as distinct from the separation $\Delta\lambda$ between adjacent lines is then derived as follows:

$$\Delta f = \Delta\frac{(C)}{\lambda} = \frac{C\Delta\lambda_s}{\lambda^2} \quad (21)$$

Then $$\frac{C\Delta\lambda_s}{\lambda^2} = \frac{(1-r)C}{2\pi L n_e} \quad (22)$$

and $$\Delta\lambda_s = \frac{(1-r)\lambda^2}{2\pi L n_e} \quad (23)$$

This last equation indicates that the greater the value of $r$ the narrower will be the line width. Similarly, for a given cavity the line width measured in terms of wavelength increases as the square of the wavelength. Finally, the longer the length L of the cavity, the narrower is the line width.

A plot of the transmission characteristics of a typical optical resonant cavity as a function of wavelength is shown in FIG. 2. As shown, resonant peaks occur at various wavelengths, each of the wavelengths being given by the equation $$\lambda_M = \frac{2L n_e}{(N+M)} \quad (24)$$

where N is any integer and M is also any number 0, 1, 2, 3 etc. As previously noted, the width of each peak, in terms of free space wevelength is $$\frac{(1-r)}{\pi L n_e}\lambda^2$$

This may be combined with the equation for the resonant wavelength for $\lambda$ when $M=0$, i.e. $\lambda_0$ to give the width as $$\frac{(1-r)}{\pi}\frac{2L}{N^2}$$

N here being the number of ½ wavelengths in a length L.
The spacing between adjacent resonant peaks is, as shown $$\frac{\lambda^2}{2L n_e}$$

Figure 4:
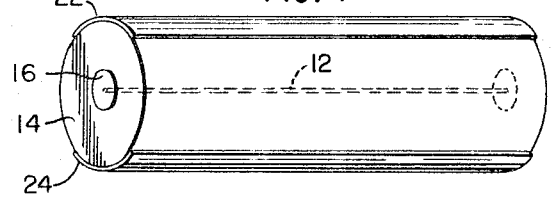
FIG. 4 is a perspective view, partially broken away, of a second embodiment of an electrically tunable optical resonant cavity.

In FIGS. 3 and 4 we have illustrated two electrically tunable optical resonant cavities. Thus as shown in FIG. 3 a pair of electrodes 18 and 20 are embedded in the cladding 14 surrounding the resonant filament 12. In FIG. 4 evaporated metallic films 22 and 24 are provided on the outside of the cladding 14. By connecting these electrodes to an adjustable source of electrical potential, the effective optical path length of the core or filament may be adjusted by reason of the Kerr effect thereby adjusting the wavelength of the energy to which the cavity is resonant, and tuning the cavity over a band of frequencies.

Figure 5:
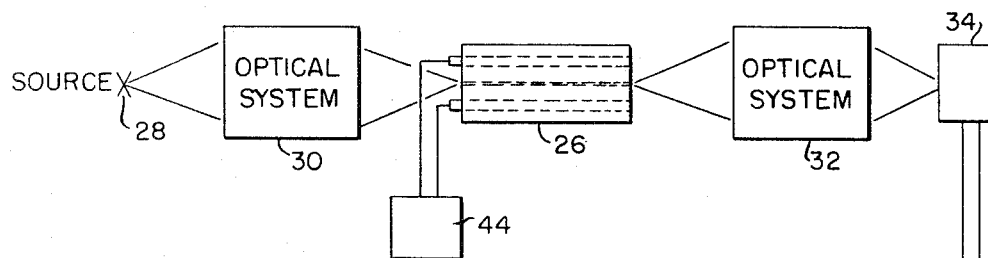
FIG. 5 is a schematic illustration showing how the optical resonant cavity of FIGS. 3 or 4 can be used in the analysis of a source spectrum.

One example of a use for a tunable cavity of this type is illustrated in FIG. 5. The cavity generally indicated at 26 shown therein is substantially identical to the cavity of FIG. 3, although it will be understood that the cavity of FIG. 4 might also be used if desired. A source whose spectral distribution it is desired to analyze is schematically illustrated at 28. Energy from this source is passed through an optical system of conventional design 30 and focused on the partially reflecting and partially transmitting film 16 on the end of cavity 26. Individual source frequencies are resonated by the cavity and energy at the resonant frequencies is transmitted through the right hand end of the cavity as seen in FIG. 3 and is collected and focussed by the optical system 32 on the photocell 34. The output signal from the photocell is amplified by amplifier 36 and applied as a video signal to an oscilloscope 38. A sweep generator 40 is provided which provides the usual saw tooth waveform (such as that shown at 42) to the oscilloscope. At the same time the sweep voltage is supplied through an attenuator or amplifier 44 to the electrodes 18 and 20 of tunable cavity 26.

The sweep voltage applied to the cavity electrodes is chosen to cause the frequency or frequencies to which the cavity is resonant to sweep across the spectrum of interest. The response of the photocell 34, displayed on oscilloscope 38 is synchronized with the sweep so that the photocell response is a measure of the energy content of the spectrum at each frequency.

To simplify component design and improve signal to noise ratio, the light from source 28 may be chopped if desired and the amplifier 36 may be tuned to the chopping frequency. In this case a detector will be provided between amplifier 36 and oscilloscope 38. Alternatively, the amplified signal from photocell 38 may be synchronously demodultaed at the chopping frequency in accordance with known practice.

Figure 6:
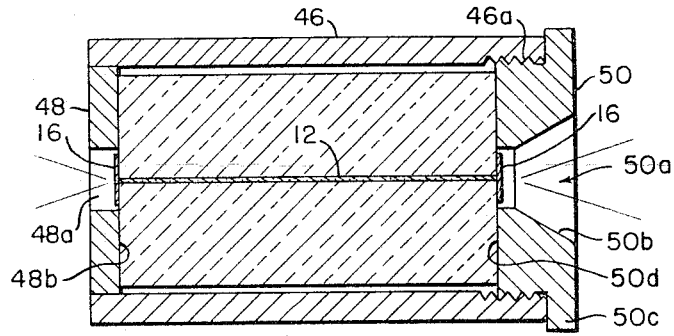
FIG. 6 is an illustration showing an optical resonant cavity tunable in response to applied pressure.

In addition to tuning cavities of the type described by electrical adjustment of the optical length, they may also be tuned by varying the actual physical length in a controlled manner. Thus, FIG. 6 illustrates an optical resonant cavity of the type described which is tuned by adjustment of the pressure on the ends of the cavity. The cavity has a filament 12, cladding 14 and partially reflecting films 16 on the ends of the filament 12, all enclosed within a metal jacket 46. Since the cladding is preferably cylindrical, the jacket 46 is also cylindrical with an end plate 48 formed integrally with the jacket. An opening 48a is formed in the end plate for the admission of energy to one end of the optical resonant cavity. At the right hand end of the jacket 46 as seen in FIG. 6, the jacket side walls are threaded as at 46a to receive therein a threaded plug 50. This plug is also provided with a central opening 50a to permit energy to be emitted from or supplied to the cavity through the plug. If the plug is reasonably thick so that the edges of the plug opening would partially obscure the end of the cavity, the opening 50a may be flared outwardly as shown at 50b. The plug 50 is also provided with a flange 50c, the periphery of which is knurled, or which may be shaped to receive a wrench or spanner.

The inner surface 48b of end plate 48 and 50d of plug 50 are in contact with the ends of the cladding 14 at all times. However, by adjustment of the plug 50, either by hand, or with appropriate tools, the pressure on the cladding may be adusted, and thereby its length. In general the filament 12 is firmly attached to the cladding and as the cladding 14 expands on contacts in response to applied pressure, the filament 12 will also vary in length, thus tuning the cavity. It should be emphasized that the required changes in length are very small—of the order of fractions of a wavelength of light—to tune cavities of this type. For this reason, the cavity of FIG. 6 should preferably be provided with a constant temperature environment. Otherwise temperature variations resulting in variations in length of the cavity will cause the cavity to become detuned.

Figure 7:
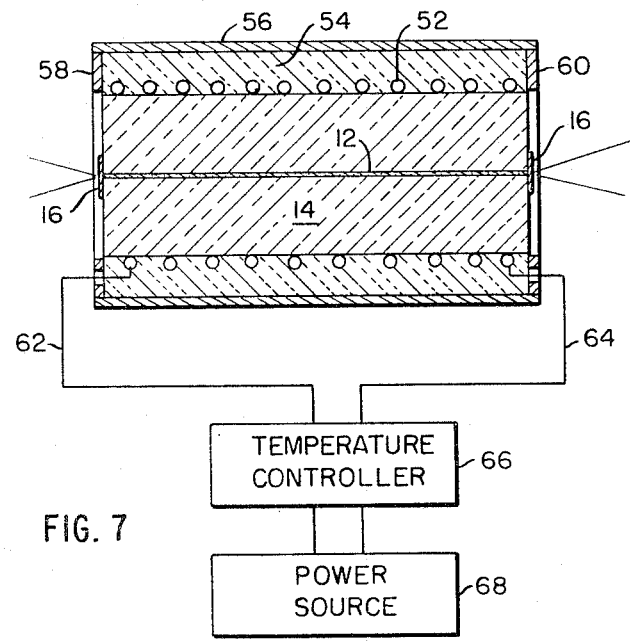
FIG. 7 is an illustration of an optical resonant cavity which is tuned by varying its temperature.

In FIG. 7 we have illustrated a cavity which is tuned by controlling its thermal environment. The cavity is identical to those previously described and includes a core or filament 12, cladding 14 and partially transmitting and partially reflecting films 16 on the ends of the filament 12. A winding of resistive wire 52 extending around and along the length of the cladding is provided. A layer of insulating material 54 surrounds the winding 52 and the entire unit is enclosed within a cylindrical jacket 56 which is provided with end plates 58 and 60; each of the end plates having a central opening for the admission of energy to the ends of the resonant cavity. Lead wires 62 and 64 are connected respectively to each end of the winding 52 and also to a temperature controller 66. The temperature controller, which may be an attenuator for example, or an electronic device to regulate the power supplied to the winding 52 in accordance with the output wavelength from the cavity, is supplied from a source of electrical power 68.

By varying the temperature of the filament 12 its physical length may be varied, thus changing the cavity tuning. The filament temperature may be controlled by controlling the power to the winding 52 surrounding the cladding.

It will be noted that the end plates 58 and 60 do not extend completely across the cladding. This insures that the filament 12 and the cladding 14 will be free to expand and contract in accordance with temperature change.

Figure 8:
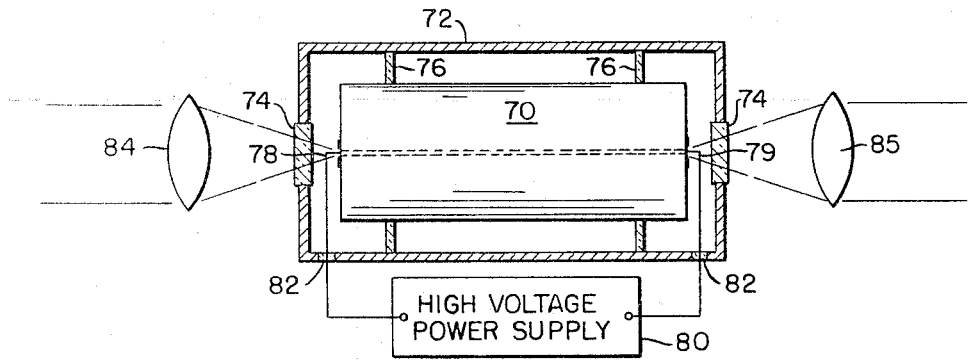
FIG. 8 is an illustration of an optical maser generator utilizing an optical resonant cavity of our invention as the resonant structure.
Figure 9:
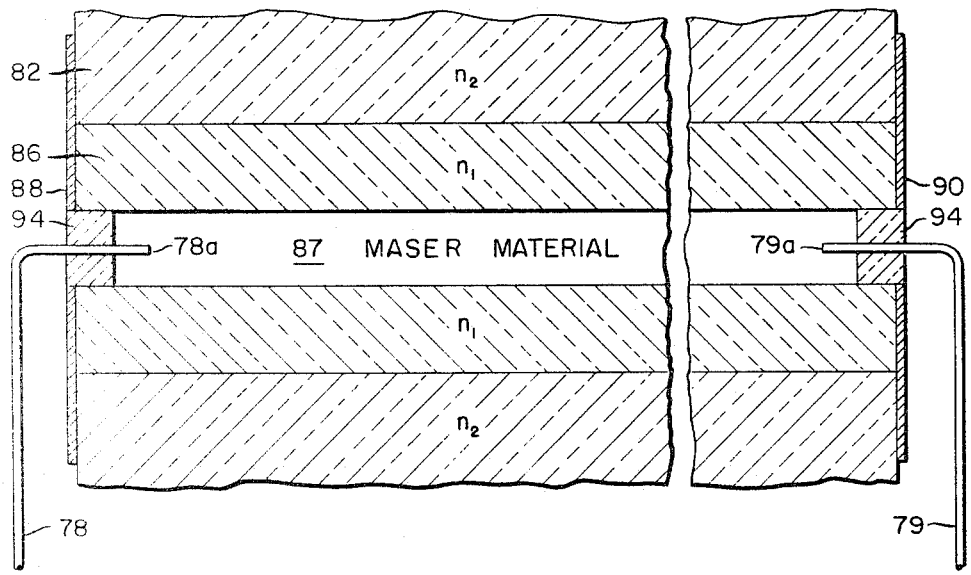
FIG. 9 is a greatly enlarged sectional view partially broken away of the optical resonant cavity construction used in the maser of FIG. 8.

In FIGS. 8 and 9 we have illustrated an optical maser generator utilizing optical resonant cavities made according to our invention as the resonant structure. As shown in FIG. 8, the maser includes an optical resonant cavity 70 whose construction is similar, but not identical, to the structure shown in FIG. 1. The detailed construction of the optical resonant cavity 70 will be discussed below in connection with FIG. 9. The cavity 70 is supported in a cylinder 72, each end of the cylinder being provided with a window 74 which is transparent to the energy generated by the maser. The cavity 70 is supported in the cylinder by support members 76 which are for example annular discs which may be of glass or metal.

The function of the cylinder 72 is to prevent ambient variations in pressure and temperature from changing the cavity length and therefore changing cavity tuning. The space between the cavity 70 and the cylinder 72 may be filled with an inert gas or it may be evacuated. Electrodes 78 and 79 are provided to supply pumping power to the cavity in a manner to be explained below and these in turn are connected to a high voltage power supply 80, the lead wires between the electrodes and the power supply being insulated from the metal cylinder 72 by the glass to metal seals 82. If the maser is to be used as a light amplifier, light to be amplified is focused on the left hand end of the cavity by the lens schematically shown at 84, and the amplified light emitted by the right hand end of the cavity is collected and collimated by the lens schematically indicated at 85. If the maser is to be used only for coherent light generation, one of the two lenses may be omitted.

The construction of the cavity 70 is similar to that shown in FIG. 1 and is illustrated in detail in FIG. 9. As shown therein, the central filament 86 of the cavity is of glass having an index of refraction $n_1$. The cladding of the cavity is also of glass and has an index of refraction $n_2$. It will be noted that the filament 86 has a hollow bore 87 formed therein; in this embodiment the bore 87 is filled with material in which the maser action is to take place. This maser material may be helium, xenon or other known gases or solid material such as ruby which are capable of energy transitions and emissions of energy of the desired wavelength. The cavity is made resonant by selecting its length such that this quantity is an integral number of half waves of the energy it is desired to amplify or generate. The diameter of the central filament 86 and the indices of refraction $n_1$ and $n_2$ are chosen in accordance with the discussion above. Preferably, the diameter and difference in index of refraction are chosen so that only a single mode will be propagated in the filament or core 86, but if the diameter which is calculated in this way is too small for practical fabrication, higher modes may be included. It should be noted that by minimizing the difference between the indices of refraction $n_1$ and $n_2$, larger filament diameters will be permissible although only a single mode will be propagated. Thus by proper selection of the difference between the indices of refraction, always of course maintaining that of the filament larger than that of the cladding, the diameter of the filament may be enlarged to a practical value and still propagate only a single mode.

In accordance with the previous description, the ends of the filament 86 are provided with thin evaporated metal coatings 88 and 90 which partially reflect and partially transmit energy emitted by the maser material and resonated by the cavity. For use as a maser generator where transmission is required from only one end of the cavity, one of the reflecting films may be made much thicker, thus, in FIG. 9, the reflecting coating 88 may be made thicker so that its transmissibility is very low but its reflectance is very high. This will increase the Q of the cavity as discussed above.

The tips of the electrode 78a and 79a are inserted into the central bore 87 of the filament 86 through insulating plugs 92 and 94 respectively. These plugs which may be of glass for example, seal the ends of the bore 87 with the maser material therein and support and insulate the electrodes 78 and 79.

Operation of the maser of FIGS. 8 and 9 is initiated by applying a high voltage from power supply 80 to the electrodes 78 and 79. An arc forms between the tips 78a and 79a, and supplies pumping energy to the maser material. The energy supplied by the arc changes the normal distribution of energy states of the atoms of the maser material to a statistically improbable distribution. As the atoms relax from this improbable distribution to a more probable one they emit energy which is coupled into the resonant mode of the optical resonant cavity and emitted from one end thereof. Mode coupling and mode selection are greatly enhanced by using an optical resonant cavity as the resonant structure in the maser of FIGS. 8 and 9, and hence much higher signal to noise ratios are achieved.

It will thus be seen that we have provided optical resonant cavities having very high Q's and have also provided design criteria for calculating the dimensions of cavities of this type so that one may readily design specific cavities for particular applications. We have also provided tunable optical resonant cavities and have illustrated how such cavities may be tuned by the application of an electrical signal to appropriate electrodes, associated with them, by applying controlled mechanical pressure to the ends of the cavity and by controlling the thermal environment of the cavity. Further we have illustrated how cavities made according to our invention may be used in spectrum analysis and as the resonant structure of optical masers.

It will thus be seen that the objects set forth above, among those made apparent from the preceding description, are efficiently attained and, since certain changes may be made in the above constructions without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described our invention, what we claim as new and desire to secure by Letters Patent is:

1. A tunable optical resonant cavity comprising, in combination, a thin elongated element of transparent material of predetermined length, said element having a mean diameter which is not greater than 25 times the longest wavelenth of the optical energy to which said cavity is resonant, said element having an index of refraction greater than the index of refraction of the medium surrounding said element, said element and said medium cooperating to define a closed optical waveguide, means forming reflective coatings on the ends of said element, at least one of said coatings partially reflecting and partially transmitting optical energy to which said cavity is resonant, and means for varying a condition affecting the optical length of said cavity to vary its length from said predetermined length.

2. The combination defined in claim 1 in which said means for varying the optical length of said element includes a pair of elongated electrodes located in close proximity with but spaced from said element, and means for applying a voltage between said electrodes.

3. The combination defined in claim 1 in which said means for varying the length of said element includes means for varying the pressure applied to said element in the longitudinal direction to thereby vary its length.

4. The combination defined in claim 1 in which said means for varying the length of said element includes means for varying the temperature of said element to thereby vary its length.

5. A tunable optical resonant cavity comprising in combination, a thin elongated glass filament of predetermined length, said filament having a mean diameter which is not greater than 25 times the longest wavelength of the optical energy to which said cavity is resonant, a glass cladding surrounding said filament, the glass of said cladding having a lower index of refraction than said filament, means forming reflective coatings on the ends of said filament, at least one of said coatings partially transmitting optical energy to which said cavity is resonant, and a pair of longitudinally extending electrodes supported by said cladding and spaced from said filament, said electrodes being insulated from each other and effective when connected to a source of electrical potential to subject said filament to an electrical field and thereby to determine the effective optical path length of the filament and hence its resonant frequency.

6. A tunable optical resonant cavity comprising in combination, a thin elongated glass filament of predetermined length, said filament having a mean diameter which is not greater than 25 times the longest wavelength of the optical energy to which said cavity is resonant, a glass cladding surrounding said filament, the glass of said cladding having a lower index of refraction than said filament, means forming reflective coatings on the ends of said filament, at least one of said coatings partially transmitting optical energy to which said cavity is resonant, a housing having open ends enclosing said cladding, an end plate having an optically transparent opening therein forming one end of said housing, a plug having an optically transparent portion closing the other end of said housing, said optically transparent portions registering with the ends of said filament, and means for longitudinally adjusting said plug to adjust the pressure on the ends of said cladding, thereby adjusting the length of said filament.

7. A tunable optical resonant cavity comprising in combination, a thin elongated glass filament of predetermined length, said filament having a mean diameter which is not greater than 25 times the longest wavelength of the optical energy to which said cavity is resonant, a glass cladding surrounding said filament, the glass of said cladding having a lower index of refraction than said filament, means forming reflective coatings on the ends of said filament, at least one of said coatings partially transmitting optical energy to which said cavity is resonant, an electrical heater winding surrounding said cladding, an insulating layer surrounding said heater winding, and electrical connections to said heater winding, whereby said winding may be supplied with electrical energy to control the temperature of said filament.

8. An optical maser comprising, in combination, an optical resonant cavity, said cavity comprising a thin elongated filament of a dielectric material of predetermined length, said filament having a mean outside diameter which is not greater than 25 times the longest wavelength of the optical energy to be generated by said maser, a cladding of a dielectric material surrounding said filament, the material of said cladding having a lower index of refraction than said filament, said filament and said cladding cooperating to define a closed optical waveguide means forming reflective coatings on the ends of said filament, the coating on at least one end of said filament partially transmitting optical energy to which said cavity is resonant, a central bore formed in said filament, means for sealing said bore, said central bore of said filament containing maser material, a pair of electrodes in said bore, and means for supplying a high voltage to said electrodes to cause an arc discharge therebetween.

9. The combination defined in claim 8 in which the radius $a$ of said filament, and index of refraction $n_1$ of said filament and $n_2$ of said cladding are so chosen with respect to the wavelength $\lambda$ of the stimulated emission that:

$$2\pi(a/\lambda)(n_1^2-n_2^2)^{1/2}<2.405$$

10. The combination defined in claim 8 in which the materials forming the filament and cladding are glass.

11. An optical resonant cavity for providing only a small number of optical resonant modes to optical energy guided thereby, said cavity comprising:
  (a) a thin elongated element of transparent dielectric material having a first refractive index;
  (b) a cladding surrounding said element, said cladding being formed of transparent dielectric material having a second refractive index lower than said first index so as to form an optical interface therebetween;
  (c) reflective coatings on the opposite ends of said element, at least one of said coatings partially transmitting energy of wave lengths to which the cavity is resonant;
  (d) said element having a mean diameter no greater than approximately 25 times the longest wavelength of the optical energy to be guided thereby;

(e) the interface between said element and said cladding cooperating with said coatings to define a closed optical waveguide cavity resonant only to optical energy of said wavelengths traveling in said modes.

12. An optical resonant cavity as defined in claim 11, in which said cladding is at least two microns in thickness.

13. An optical resonant cavity as defined in claim 11, in which said cladding has a thickness at least 100 times greater than the radius of said element.

14. An optical resonant cavity as defined in claim 11, in which the materials forming the elements and the cladding are glass.

15. An optical resonant cavity as defined in claim 11, in which:

(a) said thin elongated element has a mean radius $a$;
(b) the material of said element has an index of refraction $n_1$ to the optical energy which is to be resonated;
(c) said cladding is at least two microns in thickness and has an index of refraction $n_2$ to said energy, $n_2$ being less than $n_1$ so as to provide a controlled refractive index difference at the optical interface between the cladding and the element;
(d) said radius $a$ and said indices of refraction $n_1$ and $n_2$ being so chosen that $$2\pi(a/\lambda)(n_1^2-n_2^2)^{1/2} \leq 5.520$$

and wherein $\lambda$ is the free space wavelength of the optical energy to which the cavity is resonant.

16. An optical resonant cavity for providing only a single optical resonant mode to optical energy guided thereby, said cavity comprising:

(a) a thin elongated element of transparent material having a length substantially equal to an integral number of half-wave lengths of the energy to be resonated, and a mean radius $a$;
(b) said material having an index of refraction $n_1$ to the optical energy which is to be resonated;
(c) a cladding surrounding said element, said cladding being at least two microns in thickness and having an index of refraction $n_2$ to said energy, $n_2$ being less than $n_1$ so as to provide a controlled refractive index difference at the optical interface therebetween;
(d) means forming a reflective coating on each end of said element;
(e) the interface between said element and said cladding cooperating with said end coatings to define a closed optical resonant waveguide cavity;
(f) at least one of said coatings partially transmitting optical energy to which said cavity is resonant;
(g) said radius $a$ and said indices of refraction $n_1$ and $n_2$ being so chosen that $$2\pi(a/\lambda)(n_1^2-n_2^2)^{1/2} < 2.405$$

and wherein $\lambda$ is the free space wavelength of the optical energy to which the cavity is resonant.

References Cited by the Examiner

UNITED STATES PATENTS

| | | | |
|---|---|---|---|
| 2,825,260 | 3/1958 | O'Brien | 88—1 |
| 2,929,922 | 3/1960 | Schawlov et al. | 331—94.5 |
| 3,055,257 | 9/1962 | Boyd et al. | 88—1 |
| 3,087,374 | 4/1963 | Devlin et al. | |
| 3,144,617 | 8/1964 | Kogelnik et al. | |
| 3,159,707 | 11/1964 | Bennett et al. | |
| 3,183,937 | 5/1965 | Earley et al. | |

OTHER REFERENCES

Javan: "Possibility of Production of Negative Temperature in Gas Discharges," Physical Review Letters, vol. 3, No. 2, July 15, 1959, pp. 87–89.

"Fiber Optics, Part III, Field Flatteners," Journal of the Optical Society of America, vol. 47, No. 7, July, 1957, pp. 594–598 (Kapany et al.)

Townes et al.: "Infrared and Optical Masers," Physical Review, vol. 112, No. 6, Dec. 15, 1958, pp. 1940–1949.

JEWELL H. PEDERSEN, *Primary Examiner.*

E. G. ANDERSON, *Examiner.*

FREDERICK M. STRADER, R. L. WIBERT,
*Assistant Examiners.*